United States Patent [19]

Zey

[11] Patent Number: 5,796,953
[45] Date of Patent: Aug. 18, 1998

[54] SYSTEM HAVING USER TERMINAL CONNECTING TO A REMOTE TEST SYSTEM VIA THE INTERNET FOR REMOTELY TESTING COMMUNICATION NETWORK

[75] Inventor: David A. Zey, Fuquay-Varina, N.C.

[73] Assignee: MCI Communications Corporation, Washington, D.C.

[21] Appl. No.: 667,311

[22] Filed: Jun. 21, 1996

[51] Int. Cl.$^6$ .................................................. G06F 13/00
[52] U.S. Cl. ............................ 395/200.57; 395/200.75
[58] Field of Search .................... 395/200.54, 200.57, 395/200.75; 379/29, 93.07

[56] References Cited

U.S. PATENT DOCUMENTS 5,479,473   12/1995   Zey ........................................... 379/10

OTHER PUBLICATIONS

Martin et al., *TCP/IP Networking: Architecture, Administration, and Programming*, PTR Prentice-Hall, Inc., New Jersey, 1994, pp. 1–79 and 177–198.

*Primary Examiner*—Frank J. Asta
*Assistant Examiner*—Le Hien Luu

[57] ABSTRACT

A method and system for remotely testing a communication network provides dynamic internet access to remote test systems. Internet (TCP/IP) connections are established between remote network terminal elements. An internet connection processor is coupled between remote end-user terminals and remote test systems or units. A remote user connects to the internet connection processor through an internet data link between the remote user terminal and the internet connection processor. Once a remote user is validated and logged in, the user is provided with a display of available remote test system sites supported by the internet connection processor. The user selects a remote test site and an appropriate format in which connectivity is desired. The internet connection processor translates the remote site selection input to a corresponding internet address based on pre-loaded cross-reference data file. The internet connection processor then calls the unique TCP/IP address for the selected remote test system and establishes internet connectivity. In this way, a logical connection is formed dynamically between a remote end-user PC and a selected remote test system. Control commands for testing a communication network can then be sent from remote user terminals across interconnected TCP/IP networks to selected remote test systems. Remote test systems and remote users need only have local or IP access to the IP connection processor. Dedicated X.25 control circuits and/or operational control systems are not required to configure a connection to the remote test systems.

10 Claims, 4 Drawing Sheets

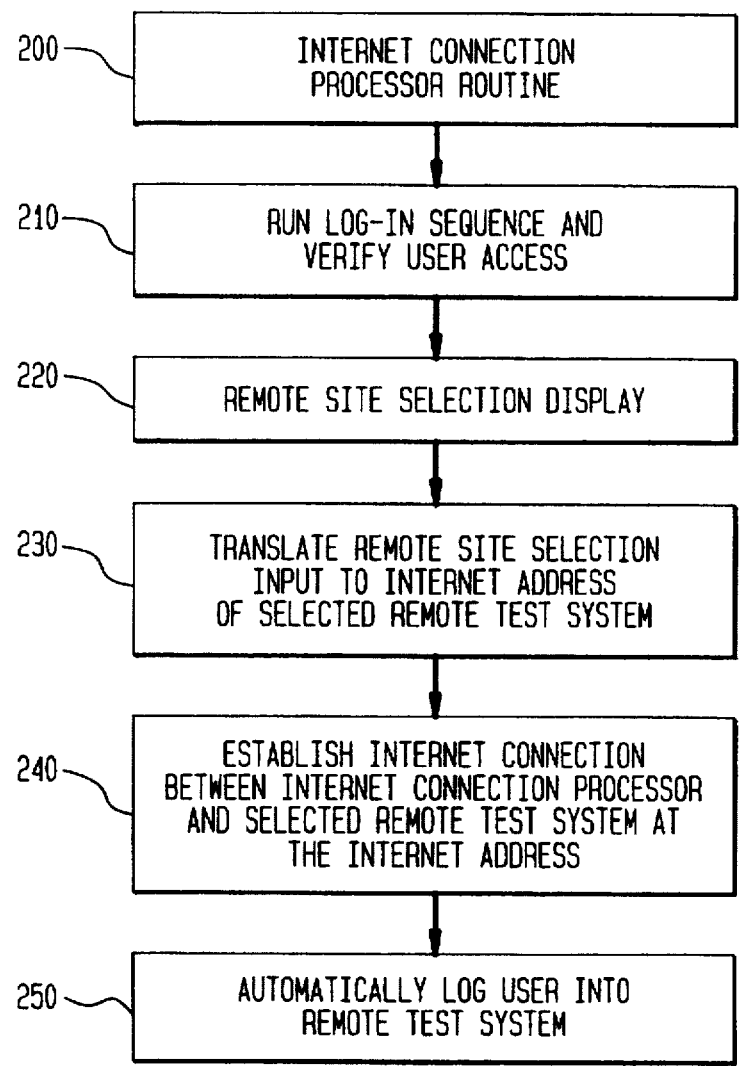

FIG. 2B

```
WELCOME TO THE DIRECT INTERNET ACCESS TEST SITE MENU
SELECT ONE OF THE FOLLOWING REMOTE TEST SYSTEMS

1. MIAMI, FL
        2. SEATTLE, WA
        3. DENVER, CO
        4. LONDON, ENGLAND
        5. CHICAGO, IL
        0. EXIT
```

225

SYSTEM HAVING USER TERMINAL CONNECTING TO A REMOTE TEST SYSTEM VIA THE INTERNET FOR REMOTELY TESTING COMMUNICATION NETWORK

BACKGROUND OF THE INVENTION

1. Field of the Invention

The present invention relates generally to telecommunication and computer internetworking. More particularly, the present invention pertains to testing a communication network through access to remote test systems.

2. Related Art

A communication network serves to transport information among a number of locations. The information is usually presented to the network in the form of time-domain electrical signals representing any combination of telephony, audio, video, and/or computer data in a variety of formats. A typical communication network consists of various physical sites, called nodes, interconnected by information conduits, called "links." Nodes are strategically distributed locally, regionally, national, and internationally, depending upon the particular geography, population, customer demand, and other network design considerations.

Test systems are often connected to nodes for performing network management functions such as network restoration, customer servicing, circuit testing, and call monitoring. Local and remote user access is usually provided to a test system. For example, an Enhanced Integrated Digital Test System (EIDTS) offers local access for computer terminals, printers, and other terminal units through TTY0–TTY3 lines, through a Test Access Digroup (TAD), to a DXC 1/0 node.

Remote users establish connectivity through a digital communication network, e.g., an X.25 Operations System network cloud (OSSNET). Calls are typically placed to a central X.25 interconnection processor (IDCS) through an X.25 interface or an Internet Protocol (IP) interface. When an X.25 interface is involved, the remote user establishes connectivity with the IDCS either directly into the X.25 OSSNET cloud through a PAD or indirectly through a local-area network (LAN) having a DOS or OS/2 Gateway supporting X.25 communication. When an IP interface is provided at the IDCS, the remote user can place an IP call, for example, via Telnet, over interconnected networks to the IDCS. Any interconnected computers networks supporting the IP protocol can be used including local-area networks (LANs) and/or wide-area-networks (WANs).

When the IDCS receives a call from a remote user, the IDCS logs in the remote user and displays a menu of available testing system sites, i.e. testing sites having an EIDTS. The remote user selects a site, the IDCS dials the appropriate Data terminal element (DTE) address of the selected site's testing system. Once a call connection is established between the IDCS through the X.25 OSSNET cloud and X.25 circuits to the selected remote testing system EIDTS, the IDCS cuts the call through from the EIDTS unit to the remote user.

Heretofore, remote user access to a test system, i.e., control, has been available through dedicated X.25 circuits or X.25 networks connected to a central Operations System network, i.e. an X.25 OSSNET cloud. For example, control from a remote user is often delivered into a remote test system at a X.25 pad or through a direct X.25 access. X.25 circuits include physical circuits requiring ordering and installation. An X.25 pad usually supports only four EIDTS units. Multiple access problems can result when the X.25 pad or X.25 circuit experiences a failure condition.

What is needed is a method and apparatus for establishing connectivity to a selected remote test system which does not require a dedicated X.25 control circuit or OSSNET network. Large numbers of remote users seeking access to remote testing systems need to be accommodated.

SUMMARY OF THE INVENTION

The present invention provides a method and system for remotely testing a communication network. Dynamic internet connections are established between remote network terminal elements. Control commands for testing a communication network can then be sent from remote user terminals across interconnected TCP/IP networks to selected remote test systems.

In a preferred embodiment, a dynamic internet connection processor is coupled between remote end-user terminals and remote test systems. A remote user connects to the internet connection processor through an internet link between the remote user terminal and the internet connection processor. For security and/or bookkeeping purposes, user identification and password information can be checked to validate the remote user prior to logging the user into the internet connection processor.

Once logged in, the user is provided with a display of available remote test system sites supported by the internet connection processor. The user then selects a remote test site. The internet connection processor translates the user remote site selection input to a corresponding internet address based on pre-loaded cross-reference data file. The internet connection processor then calls the unique internet address for the selected remote test system and establishes internet connectivity with the remote test system.

In this way, a logical internet connection (TCP/IP) or data link is formed dynamically between a remote end-user PC and a selected remote test system or unit through internet access. Remote users need only have local or internet access to the internet connection processor. Remote test system are configured for internet (TCP/IP) communication with the internet connection processor. Dedicated X.25 control circuits and/or operational control systems are not required.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art make and use the invention.

FIG. 2A is a flowchart of an internet connection processor routine according to the present invention.

FIG. 2B illustrates an example Site Menu Screen used in the internet connection processor routine of FIG. 2A.

Figure 1:
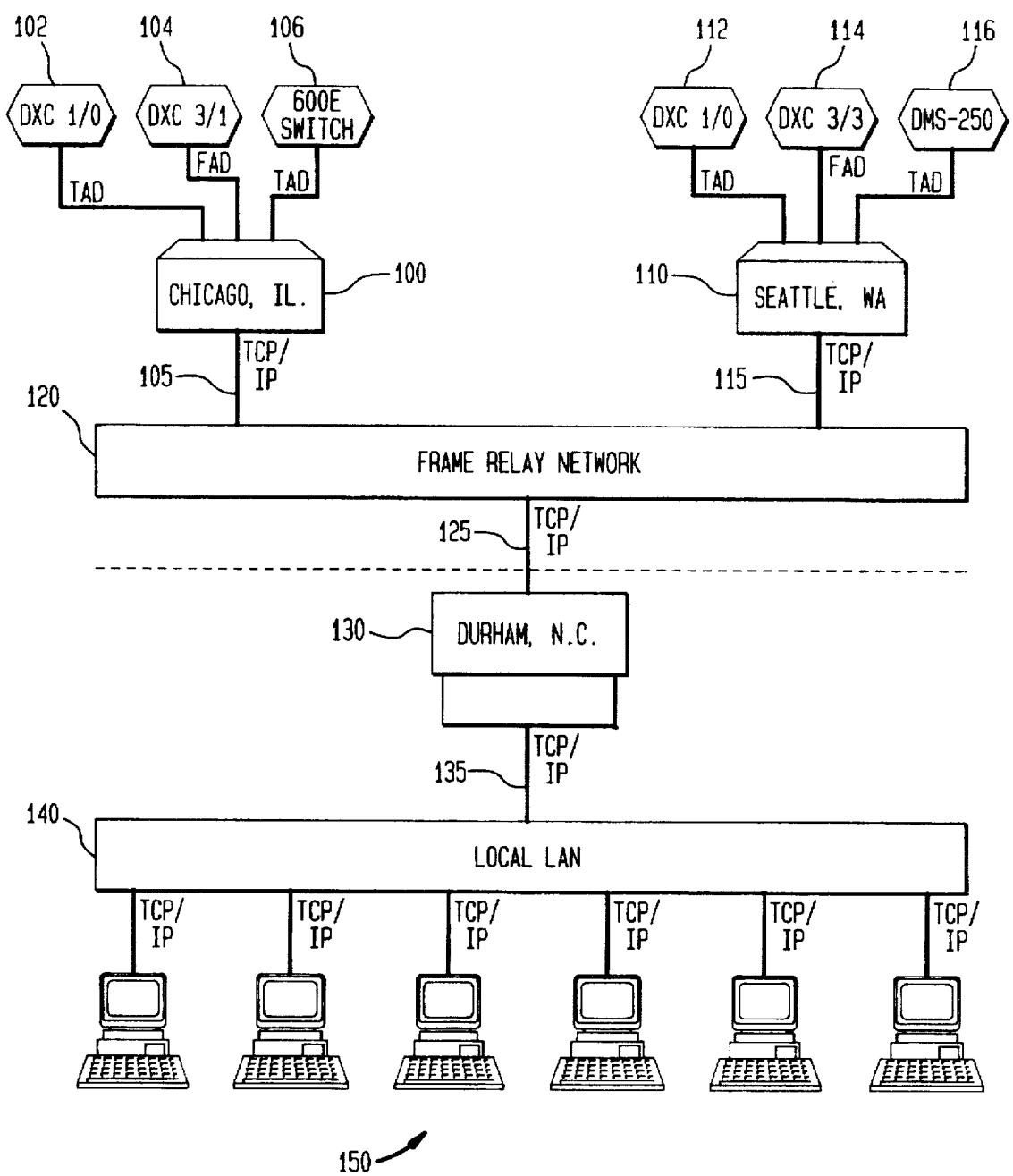
FIG. 1 is a block diagram showing remote internet access to two remote test systems according to a first embodiment of the present invention.

The present invention will now be described with reference to the accompanying drawings. In the drawings, like reference numbers indicate identical or functionally similar elements. Additionally, the left-most digit(s) of a reference number typically identifies the drawing in which the reference number first appears.

DETAILED DESCRIPTION OF THE FIGURES

The present invention provides a method and system for dynamically establishing connectivity to remote network testing systems through internet (TCP/IP) access. The present invention is described in the example environment of a communication network. Description in these terms is provided for convenience only. It is not intended that the invention be limited to application in this example environment. In fact, after reading the following description, it will become apparent to a person skilled in the relevant art how to implement the invention in alternative environments.

To more clearly delineate the present invention, an effort is made throughout the specification to adhere to the following term definitions as consistently as possible.

The term "communication network," and equivalents thereof, refer to any type of data communication network. Nodes, also referred to as sites, are distributed across a communication for performing switching, routing, multiplexing/de-multiplexing, and other network functions. These nodes can be configured as a ring, mesh, cluster, tandem combination, multi-level hierarchy, and/or any other network topology. Such nodes can include but are not limited to digital cross-connect (DXC) nodes including SONET wideband DXCs switching SONET data formats, DXC 3/3 nodes for switching high-speed DS3 data signals, DXC 3/1 nodes for switching low-speed DS1 and/or high-speed DS3 data signals, DXC 1/0 nodes for switching low-speed DS0 and/or DS1 data signals, and/or 600E and DMS-250 digital switches for DS0-level circuit testing and access of maintenance ports.

Any type of data and format can be used in the communication network. Audio, video, telephony, computer, and/or other forms of data can be used. Optical, electrical, and electromagnetic radiation signals can be transported. For example, DS0 to DS4 type data stream formats, SONET Optical Channel OC-1 to OC-198 formats, and/or any other time-domain signal at different bit rates can be used.

The terms "remote test system," "remote testing unit," and equivalents thereof, all refer to a testing system which tests one or more corresponding nodes. Such remote testing can include any type of network control function such as testing, monitoring, controlling, managing, load balancing, data routing, restoring, dynamic line configuration, private or dedicated line servicing and testing, Test Access Digroup testing (TAD), Facilities Access Digroup testing (FAD), and/or any other network control function.

The term "internet" is used as a broad descriptor covering Transmission Control Protocol and/or Internet Protocol (TCP/IP), also known as Internet, communication compatibility. For example, "internet data link" refers to any logical TCP/IP or Internet data link. See, for example, Martin, J., *TCP/IP Networking Architectitre, Administration, and Programming*, PTR Prentice-Hall, Inc., New Jersey (1994) (incorporated in its entirety herein by reference).

FIG. 1 is a block diagram showing remote internet access to two remote test systems 100, 110 according to a first embodiment of the present invention. Remote test system 100 tests communication network nodes 102, 104, and 106. Remote test system 110 tests communication network nodes 112, 114, and 116.

Remote test systems 100, 110 can be any type of computer processing system configured for internet (TCP/IP) communication. In one example, each remote test system 100, 110 consists of a VAX computer, such as, Hekimian VAX Models 2000, 4000, or 6000.

Remote test systems 100, 110 provide TAD and/or FAD capability for testing network operations at the respective nodes 102–106 and 112–116. For example, TAD access and testing capability provides DS0-level testing for DXC 1/0 nodes 102, 112, 600E switch 106, and DMS-250 switch 116. FAD access and testing capability allows testing above the DS0-level. As shown in FIG. 1, FAD access and testing capability provides T1 level testing to DXC 3/1 node 104 and DXC 3/3 node 114. The present invention, however, is not limited to these examples of TAD and FAD testing. Any type of remote testing capability for a communication network can be used for any node type.

As shown in FIG. 1, full internet (TCP/IP) connectivity is provided between remote testing systems 105, 115 and internet connection processor 130. Remote testing system 100 is coupled via internet data link 105 to frame relay network 120. Remote testing system 110 is coupled via internet data link 115 to frame relay network 120. The internet connection processor 130 is connected to the frame relay network 120 via internet data link 125. TCP/IP software and other communication modules and equipment are provided at remote testing systems 100 and 110 and internet connection processor 130 for implementing TCP/IP connectivity. Frame relay network 120 can be any type of local area network (LAN), wide area network (WAN), or any other type of interconnected data network. Any other data communication protocol and architecture which supports TCP/IP communication can be used in addition to or instead of a frame relay network 120.

A plurality of remote user terminals 150 are connected through a local LAN 140 to the internet connection processor 130 through an internet data link 135. In this way, each remote user terminal 150 is provided internet connectivity through the internet connection processor 130.

Alternative configuration arrangements can be made as long as the remote user terminal are connected locally to the internet connection processor 130 or at least have internet connectivity (e.g., through a separate host, gateway, router, or other server) to the internet connection processor 130. For example, the remote users 150 can be connected through larger networks (campus-wide, metro-wide, or wide area networks) or directly to the internet connection processor 130 in a stand-alone configuration. Firewalls and other internet security systems and methods can be provided.

TCP/IP communication software for implementing internet connectivity is provided on the internet connection processor. In the LAN configuration shown in FIG. 1, TCP/IP communication software is typically provided on a separate host, gateway, bridge, or router (not shown) connected to the local LAN 140 for servicing all of the remote user terminals 150. Of course, TCP/IP communication software can be run on a remote user terminal 150 with sufficient processing power for dialing the internet connection processor 130 directly. Alternatively, internet connection processor 130 can act as a host server for each of the remote terminal elements 150.

The operation of the internet connection processor 130 in dynamically establishing an internet connection between any remote terminal 150 and remote test systems 105, 115 will be described further with respect to FIGS. 2A and 2B. FIG. 2A shows an internet connection processor routine 200.

For example, to gain access to remote testing system 105, a user at a remote user terminal 150 first dials the internet connection processor 130. The internet connection processor 130 executes a login sequence to verify user access (step 210). This login sequence can consist of a conventional Telnet interactive login routine. Password checking and any other security and/or authorization sequence can also be performed.

In step 220, a remote site selection display is presented to the remote user at the remote terminal 150. FIG. 2B shows an example of a remote site selection display menu 225. This data for this display menu 225 can be transmitted by the internet connection processor 130 to the remote terminal 150 over local LAN 140. Alternatively, data for the remote menu site display 225 can be preloaded into the remote terminal 150 for display after a successful login sequence.

As shown in FIG. 2B, the user is presented with a number of remote test systems from which to select. For example, these remote test systems can be identified by the city or region in which the remote test system and node being tested is located, such as Miami, Seattle, Denver, London, and Chicago. The user enters a selection site input, i.e., a number corresponding to the desired remote test system in which access is desired. This remote site selection input is then sent from the remote terminal 150 over local LAN 140 through internet data link 135 to the internet connection processor 130. The internet connection processor 130 then translates the remote site selection input into an internet address of the remote selected test system (step 230). For example, a database can be stored in the internet connection processor 130 which lists an internet address for each of the remote test systems. The database correlates the internet addresses with the remote site selection inputs which identify the remote network test systems.

In step 240, the internet connection processor 130 establishes a first internet connection between the internet connection processor 130 and the selected remote test system at the internet address determined in step 230. In step 250, the internet connection processor 130 then automatically logs the user into the selected remote testing system. Additional security log-in sequences can be added to gain access to the selected remote testing system.

In this way, a remote user can dynamically test the communication network node through internet access at the selected remote testing system site. Control commands can then be transported from remote terminal 150 to the selected remote test system for controlling a network node. Through dynamic internet access, the present invention unleashes network testing capability for any node to a virtual unlimited number of remote users regardless of location. As shown in FIG. 1, a remote user anywhere in the country—for example, in Durham, North Carolina—can gain access to remote test systems at other locations in the communication network, such as Chicago, Ill. or Seattle, Wash. This greatly enhances the capacity, flexibility, and range of network testing, thereby, improving overall communication performance and customer satisfaction.

Figure 3:
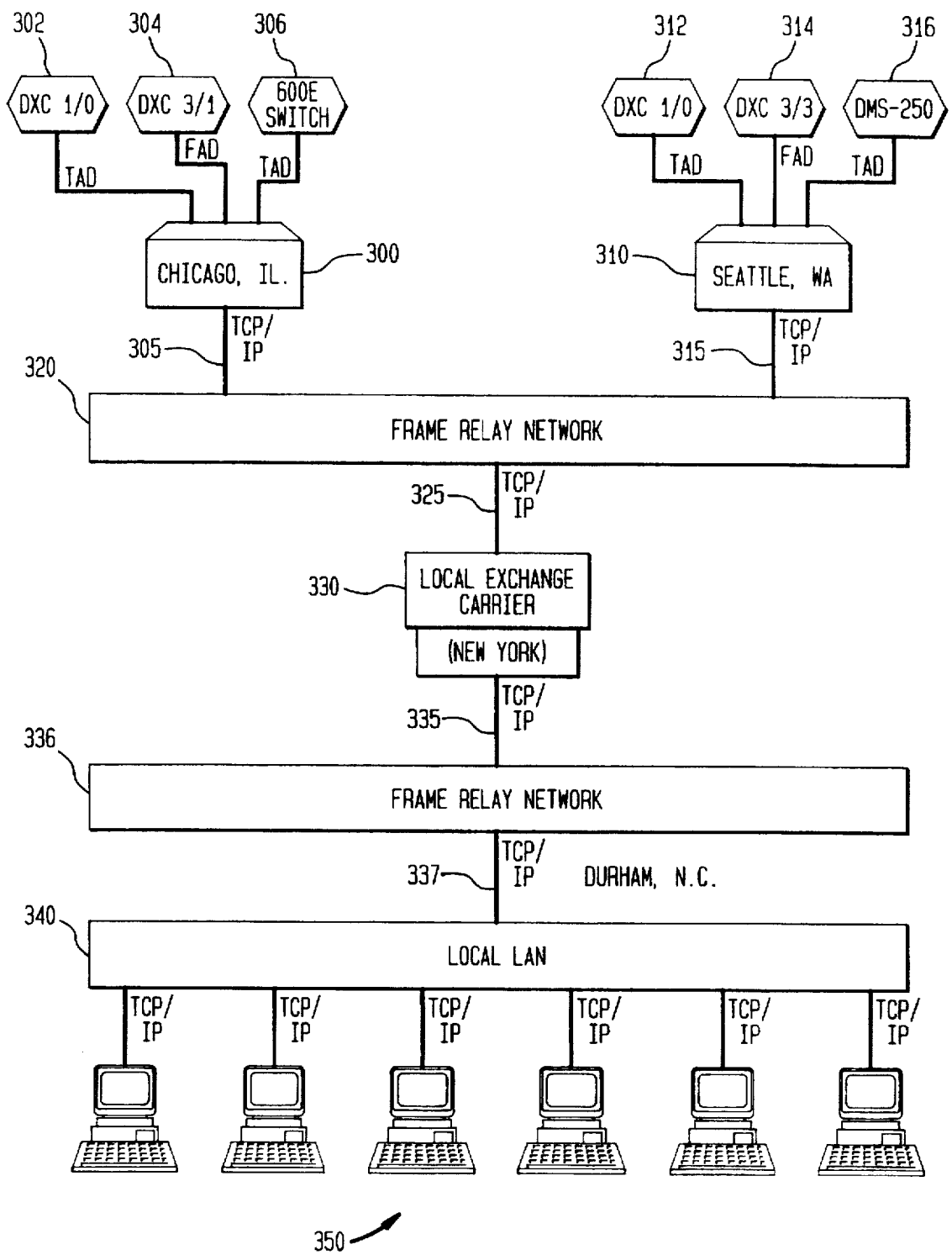
FIG. 3 is a block diagram showing remote internet access to two remote test systems belonging to a local exchange carrier according to a second embodiment of the present invention.

FIG. 3 is a block diagram showing remote internet access to two remote testing systems 300 and 310 through a local exchange carrier according to a second embodiment of the present invention. In this example, a remote user 350 can gain access through a local LAN 340, an internet data link 337, a Frame Relay network 336, and an internet data link 335 to internet connection processor 330. The internet connection processor 330 is owned and operated by a local exchange carrier, i.e., a New York LEC, or other entities separate from the remote users 350. However, as described with respect to FIGS. 2A and 2B, a pre-authorized login sequence is executed by the internet connection processor 330 to verify user access.

Otherwise, the operation of the internet connection processor 330 proceeds as described before with respect to internet connection processor 130. Namely, a display site menu screen is displayed to the remote user listing available remote test systems 300, 310 of the local exchange carrier. The internet connection processor 330 then translates a remote site selection input to an internet address of the selected remote test system and dynamically establishes an internet connection between the internet connection processor 330 and the selected remote testing system.

For example, if remote test system 300 has been selected, an internet connection will be established consisting of internet datalink 325, frame relay network 320, and internet datalink 305. DXC 1/0 node 302, DXC 3/1 node 304 and 600E switch 306 can then be tested. Alternatively, when remote test system 310 has been selected, an internet connection will be established consisting of internet data link 325, frame relay network 320, and internet data link 315. DXC 1/0 node 312, DXC 3/1 node 314 and DMS-250 switch 316 can then be tested.

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for connecting to a remote test system coupled with a node in a telecommunications network, wherein said remote test system tests communication circuits within the telecommunications network, the method comprising the steps of:

connecting to an internet connection processor from a user terminal;

logging in to said internet connection processor from said user terminal;

receiving, at said user terminal, a remote site selection menu from said internet connection processor, said remote site selection menu comprising a list of one or more remote sites each said remote sites being associated with a particular remote test system;

displaying, at said user terminal, said remote site selection menu;

selecting said remote test system by choosing a remote site from said remote site selection menu;

identifying, at said internet connection processor, an internet address for said remote test system; and establishing an internet connection between said user terminal and said remote test system for remotely testing telecommunication circuit paths.

2. The method of claim 1, wherein said logging in step comprises a Telnet interactive log-in.

3. The method of claim 1, wherein said identifying step comprises:

reading a database in said internet connection processor which lists internet addresses for a plurality of remote test systems correlated with remote user site selection inputs identifying said remote test systems.

4. The method of claim 1, wherein said internet connection processor comprises a gateway to a local exchange carrier.

5. The method of claim 1, wherein said first internet connection supports TCP/IP protocols.

6. A system for remotely testing a communication network comprising:

a remote user terminal;

a plurality of remote test systems each of said test systems coupled with a node in a telecommunications network for testing communication circuits;

an internet connection processor coupled between said remote user terminal and said remote test systems; wherein, said remote user terminal and said internet connection processor communicate over a first internet data link, and said internet connection processor receives a remote user site selection input over said first internet data link identifying a selected remote test system, translates said remote user site selection input into a corresponding internet address for said selected remote test system, and establishes a second internet data link between said internet connection processor and said selected remote test system at said internet address; whereby, said remote user can test the communication network through dynamic internet access to each remote test system.

7. The system of claim 6, wherein said internet connection processor further comprises:

a database in said internet connection processor which lists internet addresses for said plurality of remote test systems correlated with remote user site selection inputs identifying said remote test systems.

8. The system of claim 6, wherein control commands are transported over said first and second internet data links from said remote user terminal to said selected remote test system.

9. The system of claim 6, wherein said internet connection processor comprises a gateway to a local exchange carrier.

10. The system of claim 6, wherein said first and second internet data links each support TCP/IP protocols.

* * * * *